(12) United States Patent
Haeusser et al.

(10) Patent No.: US 10,589,730 B2
(45) Date of Patent: Mar. 17, 2020

(54) HYDRAULIC UNIT OF A VEHICLE BRAKE SYSTEM HAVING AN ECCENTRIC CHAMBER

(71) Applicant: Robert Bosch GmbH, Stuttgart (DE)

(72) Inventors: Bernd Haeusser, Neckarwestheim (DE); Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 16/054,641

(22) Filed: Aug. 3, 2018

(65) Prior Publication Data

US 2019/0077389 A1 Mar. 14, 2019

(30) Foreign Application Priority Data

Sep. 12, 2017 (DE) .................. 10 2017 216 014

(51) Int. Cl.
| | | |
|---|---|---|
| *B60T 8/40* | (2006.01) | |
| *B60T 17/02* | (2006.01) | |
| *F04B 23/06* | (2006.01) | |
| *F04B 1/053* | (2020.01) | |
| *F04B 1/0443* | (2020.01) | |
| *B60T 13/16* | (2006.01) | |
| *F04B 9/04* | (2006.01) | |
| *F04B 43/12* | (2006.01) | |

(52) U.S. Cl.
CPC .......... *B60T 17/02* (2013.01); *B60T 8/4031* (2013.01); *B60T 13/16* (2013.01); *F04B 1/0443* (2013.01); *F04B 1/053* (2013.01); *F04B 9/045* (2013.01); *F04B 23/06* (2013.01); *F04B 43/123* (2013.01)

(58) Field of Classification Search
CPC .... F04B 1/0404; F04B 1/0413; F04B 1/0443; F04B 1/0448; F04B 1/053; F04C 5/00; B60T 8/4031
See application file for complete search history.

(56) References Cited

U.S. PATENT DOCUMENTS

| | | | | |
|---|---|---|---|---|
| 6,113,364 A * | 9/2000 | Haecker | ................ | B60T 8/4031 417/434 |
| 7,866,764 B2 * | 1/2011 | Crimpita | ................ | B60T 8/368 303/116.4 |

FOREIGN PATENT DOCUMENTS

JP 01170769 A * 7/1989

OTHER PUBLICATIONS

Machine translation of JP 01-170769 (no date).*

* cited by examiner

*Primary Examiner* — Nicholas J Lane
(74) *Attorney, Agent, or Firm* — Maginot, Moore & Beck LLP

(57) ABSTRACT

A hydraulic unit of a vehicle brake system includes at least one pump element that is driven via an eccentric, which is enclosed by an eccentric chamber. The hydraulic unit also includes a vacuum pump that is configured to maintain a vacuum in the eccentric chamber while the hydraulic unit is in operation.

10 Claims, 3 Drawing Sheets

HYDRAULIC UNIT OF A VEHICLE BRAKE SYSTEM HAVING AN ECCENTRIC CHAMBER

This application claims priority under 35 U.S.C. § 119 to patent application no. DE 10 2017 216 014.4, filed on Sep. 12, 2017 in Germany, the disclosure of which is incorporated herein by reference in its entirety.

BACKGROUND

The disclosure relates to a hydraulic unit of a vehicle brake system having at least one pump element, which is driven by means of an eccentric, which is enclosed by an eccentric chamber. The disclosure further relates to a method for operating such a hydraulic unit and to use of such a hydraulic unit in a vehicle brake system.

Hydraulic units are used in vehicle brake systems, for example motor cars or trucks, in order to be able to provide a controlled brake pressure in associated brake circuits. This relates, in particular, to functions of an antilock braking system (ABS) and/or an electronic stability program (ESP). Known hydraulic units comprise a hydraulic block in the form of a block-shaped housing, in which multiple working bores are provided. The hydraulic block also serves with at least one corresponding bore as pump housing for at least one pump element, which works on the principle of a piston pump. For this purpose, the separate pump element comprises a pump piston, which by means of an eccentric is driven to perform a reciprocating translational movement in an associated pump cylinder. Moved in this way, it is possible to pump and deliver a hydraulic fluid in the form of a brake fluid, which serves to generate the brake pressure. Here the eccentric is driven by means of a shaft, which is supported in the hydraulic block and is coupled to a drive motor, transmitting the power in such a way that the shaft can be made to perform a rotational movement.

In particular, the rotational movement of the shaft and the translational movement of the separate pump piston during operation of the hydraulic unit can cause oscillations in and on the hydraulic unit. The oscillations may be transmitted to a wide variety of seals, which serve in an associated hydraulic system to seal off the hydraulic fluid from an external space surrounding the hydraulic system. Seals of the pump elements or piston pumps are particularly affected by this. This phenomenon is widely known in the field of hydraulics and is not confined to vehicle brake systems.

SUMMARY

According to the disclosure a hydraulic unit of a vehicle brake system is created, having at least one pump element, which is driven by means of an eccentric, which is enclosed by an eccentric chamber. The pump provided here is a vacuum pump, which serves to maintain a vacuum in the eccentric chamber whilst the hydraulic unit is in operation.

By means of the vacuum pump according to the disclosure it is possible to maintain and/or generate a vacuum or negative pressure in the eccentric chamber while ever the hydraulic unit is in operation. This allows a gas, in particular air, commonly present in the eccentric chamber, and/or other impurities to be evacuated from the eccentric chamber. Once evacuated in this way, it is possible to prevent the gas from the eccentric chamber getting into a hydraulic system associated with the hydraulic unit. The term hydraulic system here is taken to mean a system carrying hydraulic fluid, which in particular comprises at least one pump element, at least one associated hydraulic line and at least one associated valve. The hydraulic system is preferably designed as a hydraulic circuit of a brake circuit.

A gas, in particular air, otherwise getting into the hydraulic system during operation of the hydraulic unit has unwanted effects, depending on the function of the hydraulic system. For example, air that has got into the hydraulic system can reduce its efficiency and together with a hydraulic fluid can even ignite.

By means of the vacuum pump according to the disclosure, on the other hand, it is possible to prevent an unwanted ingress of gas, in particular air, into the hydraulic system while ever the hydraulic unit is in operation. A hydraulic unit is created that functions with particular efficiency and reliability throughout its operation.

It has emerged, moreover, that the vacuum pump according to the disclosure is even capable of improving a sealing effect of the seals in the hydraulic system. A reduced sealing effect of the seals due to the oscillations described above, which are transmitted to the seals during operation of the hydraulic unit, has commonly been observable. The reduced sealing effect can be reliably compensated for by the vacuum that is maintained according to the disclosure. Overall, it is thereby possible to achieve a considerable improvement in a sealing situation in the associated vehicle brake system, particularly in and/or on the hydraulic unit.

Furthermore, during operation a negative pressure occurs in the hydraulic system, which arises with a reciprocating movement of a pump piston in the separate pump element. Such a pump vacuum can be purposely counteracted by the vacuum pump according to the disclosure, so that gas cannot flow past an associated sealing ring into the pump element. The sealing ring can thereby be of a simple and cost-effective construction, designed primarily for sealing off liquids, whilst gas is prevented from flowing past the sealing ring by means of the vacuum according to the disclosure.

For this purpose, according to the disclosure a vacuum pump is preferably provided, which serves to maintain a vacuum in the eccentric chamber whilst the hydraulic unit is in operation, in such a way that during operation of the hydraulic unit the vacuum prevents a pump vacuum, occurring in the pump element, sucking in gas from the eccentric chamber. It is thereby possible by means of the energy-saving use of the vacuum pump to generate a vacuum sufficient to purposely counteract the pump vacuum and to prevent an unwanted ingress of gas into the pump element at all times.

The eccentric comprises, in particular, a shaft or eccentric shaft, on which an eccentric bearing is arranged, on which a pump piston associated with the separate pump element is supported.

The eccentric chamber enclosing the eccentric is preferably created by means of a corresponding eccentric bore in a hydraulic block of the hydraulic unit. The eccentric, in particular with its eccentric bearing on which the separate pump piston is supported, is arranged in the eccentric bore. The eccentric chamber is thereby defined, in particular, by a wall of the hydraulic block forming the eccentric bore and by an outside wall of the eccentric, in particular of the eccentric bearing, situated in the eccentric chamber.

The vacuum pump according to the disclosure is furthermore preferably adapted to maintaining the vacuum in the eccentric chamber continuously whilst the hydraulic unit is in operation. The hydraulic unit can thereby be operated especially uniformly without any great fluctuations in the negative pressure.

A control unit is more preferably provided, which serves to control the vacuum pump in such a way that a vacuum correspondingly matched to required pressure conditions is maintained in the eccentric chamber.

According to the disclosure the vacuum pump is advantageously driven by means of the eccentric. Driven in this way, the eccentric with its drive is also used for the vacuum pump. Such a drive saves components, overall space and energy. For this purpose, the eccentric preferably comprises a shaft, on which the eccentric bearing is arranged. In this case the shaft has a shaft axis and is preferably formed concentrically about the shaft axis over its entire longitudinal extent, whilst the eccentric bearing is designed eccentrically in relation to the shaft axis. Alternatively, the shaft is designed in portions with an axis of one portion itself eccentric in relation to the shaft axis and the eccentric bearing arranged thereon concentric with the axis of that portion. Such a form of eccentricity means that, under a rotational movement of the eccentric, a drive of the vacuum pump preferably supported on the eccentric bearing is made to perform a translational driving movement. Alternatively and more preferably in being especially energy and space-saving, the vacuum pump is made to perform a rotational driving movement by means of the rotational movement of the eccentric itself.

The vacuum pump is preferably designed as a pump which comprises a pump chamber that is at least partially closed during operation of the hydraulic unit. In such a pump chamber the gas and/or other impurities can be purposely pumped out of the eccentric chamber without any losses.

According to the disclosure the vacuum pump is advantageously designed as a peristaltic pump. The peristaltic pump is a positive-displacement pump which comprises a tube as line connection, through which the gas from the eccentric chamber can be forced by means of an external mechanical deformation of the tube. Such a tube takes up little overall space and is moreover particularly lightweight. The peristaltic pump preferred according to the disclosure thereby creates a very space and weight-saving vacuum pump of the hydraulic unit.

According to a particularly space-saving form of the disclosure the vacuum pump, particularly as a peristaltic pump, is advantageously arranged substantially directly in the eccentric chamber. For this purpose, the tube is preferably arranged in such a way that the tube is squeezed by the eccentric in its rotational movement. In this case the tube is caught between the eccentric and a wall of the eccentric chamber surrounding the eccentric where the inside wall of the tube is compressed. A clamped or closed pump chamber of the tube is thereby formed, in which the gas as an isolated volume is expelled from the eccentric chamber during the rotational movement. The rotational movement of the eccentric is therefore exploited as an especially energy-efficient way both of deforming the tube and of driving at least the one pump element. The tube is more preferably supported and guided circumferentially around the eccentric radially between the outside wall of the eccentric and an opposing wall of the hydraulic block. This allows an especially compact fitting of the vacuum pump in the hydraulic unit. In addition, the eccentric deforms the tube throughout its entire rotational movement. An especially uniform pumping action can be achieved.

Furthermore, according to the disclosure the vacuum pump is advantageously provided with a line connection which leads out of the eccentric chamber and in which a non-return valve is arranged. By means of the line connection the gas and/or other impurities is/are purposely ducted out of the eccentric chamber through the line connection. Here the non-return valve is adapted, in particular, to prevent a subsequent flow of gas and/or other impurities from outside back into the line connection. The vacuum in the eccentric chamber can thereby be reliably and uniformly maintained.

It is especially advantageous if the line connection is arranged directly in the eccentric chamber, saving space. The line connection is preferably designed as a tube, which is more preferably an integral part of the peristaltic pump.

In addition, according to the disclosure the line connection is preferably designed to lead into the surroundings of the hydraulic unit. Designed in this way, the gas and/or other impurities can be led not only out of the eccentric chamber but even out of the hydraulic unit and carried away from the latter. The gas and/or other impurities can be safely removed from the sensitive hydraulic system.

Furthermore, according to the disclosure the line connection is advantageously designed to lead out of the underside of the eccentric chamber, relative to the fitted position of the hydraulic unit. Designed in this way, the vacuum pump can additionally serve to pump off any leakage of hydraulic fluid and/or engine fluid occurring, which collects on the underside of the eccentric chamber.

The disclosure is furthermore also directed towards a method for operating a hydraulic unit, in particular a unit of this type, of a vehicle brake system, having at least one pump element, in which at least the one pump element is driven by means of an eccentric, which is enclosed by an eccentric chamber. Here a vacuum pump is provided, which serves to maintain a vacuum in the eccentric chamber whilst the hydraulic unit is in operation. The vacuum pump allows a gas, in particular air, and/or other substances to be evacuated from the eccentric chamber. This prevents the gas from the eccentric chamber getting into a hydraulic system associated with the hydraulic unit, reducing its efficiency and causing damage there. By means of the method according to the disclosure the hydraulic unit of a vehicle brake system can be operated particularly efficiently and reliably.

In the method according to the disclosure a vacuum is preferably maintained in the eccentric chamber whilst the hydraulic unit is in operation, in such a way that during operation of the hydraulic unit the vacuum prevents a pump vacuum, occurring in the pump element, sucking in gas from the eccentric chamber. Throughout the operation, therefore, an unwanted ingress of gas into the separate pump element is reliably prevented. The pump element is thereby able to function with a constant efficiency. Moreover, a vacuum is purposely maintained in the eccentric chamber which is sufficient to be able to purposely counteract the pump vacuum. It has been shown that such a vacuum is sufficient to allow a stable operation of the hydraulic unit and no unnecessary energy is thereby consumed.

According to the disclosure the vacuum pump is advantageously driven by means of the eccentric, which affords an especially energy-saving method.

Furthermore, according to the disclosure the vacuum pump is advantageously designed as a peristaltic pump. The peristaltic pump comprises a tube as line connection, which in particular is arranged in the eccentric chamber. Arranged in this way, as it rotates the eccentric squeezes the tube against a wall of the eccentric chamber surrounding the eccentric. A closed pump chamber is thereby formed inside the tube, the volume of which is expelled from the eccentric chamber by the rotating eccentric. The tube here takes up a particularly small amount of space in the eccentric chamber and can be deformed in an especially efficient manner by means of the eccentric. A method suited to the operation of the vehicle brake system is thereby created, which needs little overall space in an associated vehicle and does not consume any additional energy.

A non-return valve arranged in a line connection leading out of the eccentric chamber more preferably serves to prevent gas flowing into the line connection from outside. Thus prevented, the vacuum in the eccentric chamber is constantly maintained. In particular the line connection here is a tube of a peristaltic pump, in which such a non-return valve is arranged.

In addition, the disclosure is also directed towards use of such a hydraulic unit in a vehicle brake system. The hydraulic unit according to the disclosure serves to prevent an unwanted ingress of gas, in particular air, into the hydraulic system. The efficiency of the hydraulic unit, particularly of at least the one associated pump element, is thereby stabilized and uniformly maintained while ever the hydraulic unit is in operation. An especially efficient and reliable vehicle brake system is created.

BRIEF DESCRIPTION OF THE DRAWINGS

An exemplary embodiment of the solution according to the disclosure is explained in more detail below, referring to the schematic drawings attached, of which.

DETAILED DESCRIPTION

Figure 1:
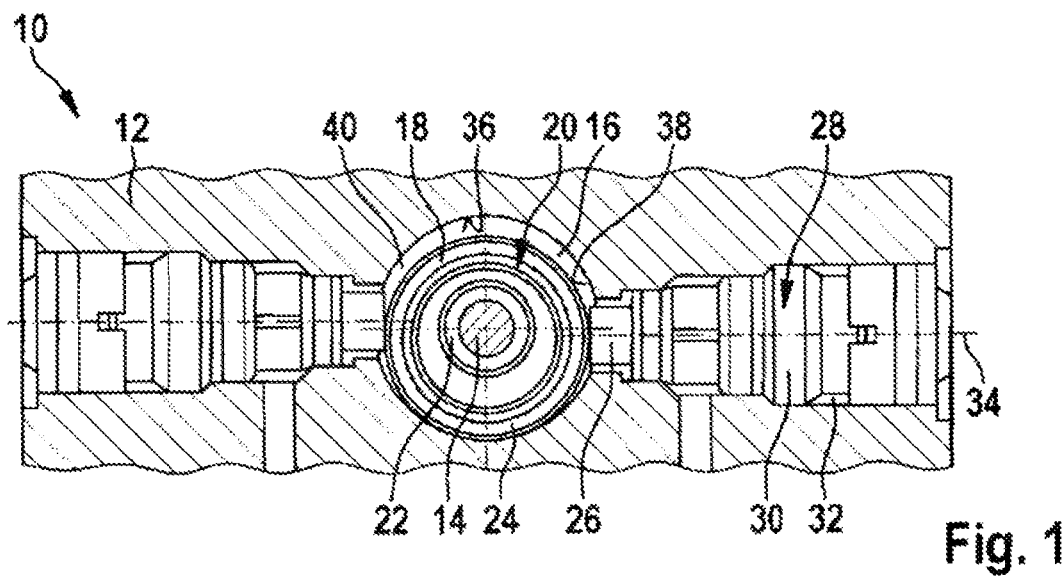
FIG. 1 shows a partially sectional top view of a part of a hydraulic unit according to the prior art.
Figure 2:
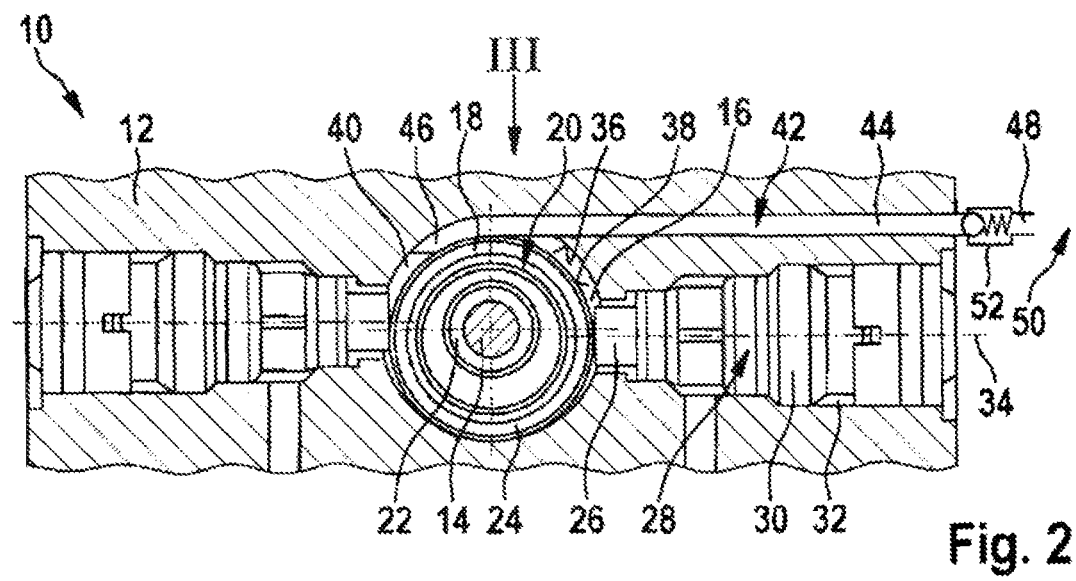
FIG. 2 shows a partially sectional top view of a part of a hydraulic unit according to the disclosure.
Figure 3:
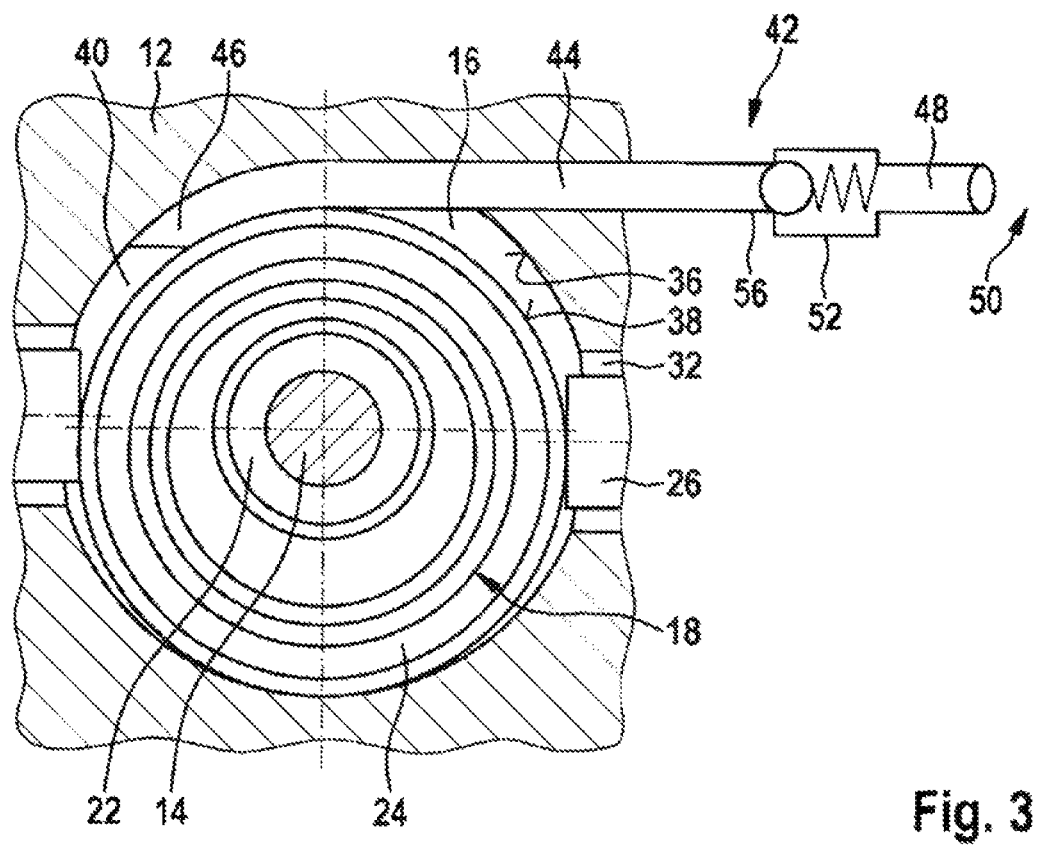
FIG. 3 shows the detail III according to FIG. 2 in a first rotational position of the eccentric.

FIG. 1 shows a hydraulic unit 10 of a vehicle brake system, not further represented, which in particular affords an antilock, an anti-slip and a vehicle dynamics control function (ABS, ASC and ESP).

The hydraulic unit 10 comprises a cuboid hydraulic block 12, shown only in part, as block-shaped pump housing and a drive motor externally affixed thereto, which is not further represented.

The drive motor here is conventionally designed as an electric motor, which comprises a rotatable motor shaft or shaft 14. The shaft 14 is led through a bore 16 into the hydraulic block 12, where it serves as eccentric shaft for driving an eccentric bearing 18 arranged in the hydraulic block 12. The eccentric bearing 18 eccentrically surrounds the shaft 14 and is coupled to the shaft 14 for transmitting power. The shaft 14 forms part, together with the eccentric bearing 18, of an eccentric drive or eccentric 20.

The eccentric bearing 18 comprises an inner ring 22 and an outer ring 24, arranged eccentrically in relation to the inner ring 22 and coupled to the inner ring 22 for transmitting power. At least one pump piston 26 of a pump element 28 is supported on the outer ring 24. Here two pump elements 28 are arranged largely diametrically opposite on the shaft 14, each associated pump piston 26 being supported on the eccentric bearing 18. The separate pump piston 26 is guided in a pump cylinder 30, which is arranged in a bore 32 in the hydraulic block 12 extending perpendicular to the bore 16.

Arranged in this way, as the shaft 14 rotates each separate pump piston 26 is made, by means of the eccentric 20, to perform a reciprocating movement along its piston axis 24 in the associated pump cylinder 30. Moved in this way, a hydraulic fluid is pumped in a conventional manner by means of further, known components (not stated here) into the pump cylinder 30 and through the pump cylinder 30 into a hydraulic system (not represented here).

The eccentric 20 here is enclosed in the hydraulic block 12 by a wall 36 formed by means of the bore 16. The wall 36, together with the eccentric 20 at its outer contour, in particular with an outer wall 38 of the eccentric bearing 18, substantially forms an eccentric chamber 40 enclosing the eccentric 20. The main substance present in the eccentric chamber 40 is a gas, usually air. Other constituents, such as leakage impurities, may also be present in the eccentric chamber 40.

FIGS. 2 to 5 show a hydraulic unit 10 in which, in contrast to FIG. 1, a vacuum pump 42 is provided, which serves to maintain a vacuum in the eccentric chamber 40 whilst the hydraulic unit 10 is in operation. In this case the vacuum pump 42 is arranged directly in the eccentric chamber 40 and is designed as a tube pump/tube squeeze pump/peristaltic pump. For this purpose, the vacuum pump 42 comprises a line connection 44 in the form of a tube. The line connection 44 has two ends 46 and 48, of which the one end 46 is arranged in the eccentric chamber 40 and the other end 48 outside the eccentric chamber 40. Arranged in this way, the line connection 44 leads out of the eccentric chamber 44 into the surroundings 50 of the hydraulic unit 10. Furthermore, a non-return valve 52, which serves to prevent a return of gas, in particular air, and/or other impurities from the surroundings 50 into the eccentric chamber 40, is provided at the outside end 48 of the line connection 44.

Figure 4:
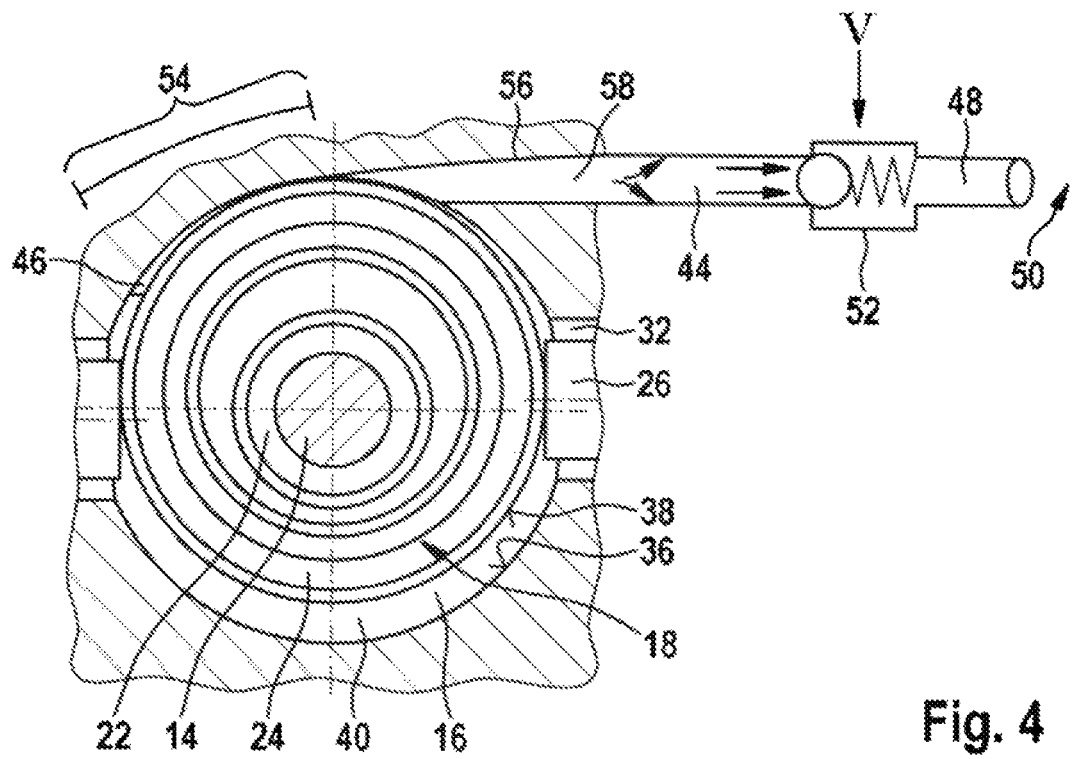
FIG. 4 shows the detail III according to FIG. 2 in a second rotational position of the eccentric.
Figure 5:
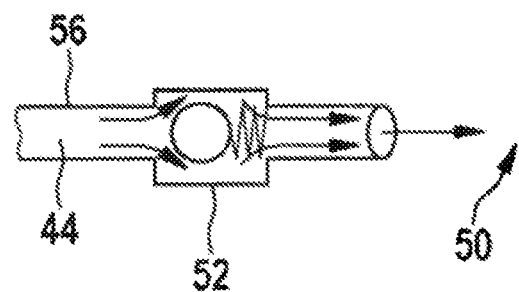
FIG. 5 shows the detail V according to FIG. 4 in a third rotational position of the eccentric.

During operation of the hydraulic unit 10 the vacuum pump 42 is driven by means of the eccentric 20 and thereby generates a vacuum in the eccentric chamber 40, which is maintained while ever the hydraulic unit 10 is in operation. For this purpose, gas, in particular air, and/or other constituents present in the eccentric chamber 40 are drawn through the end 46 of the line connection 44 into the line connection 44 by means of a suction generated by the vacuum pump 42. From there the gas and/or other constituents are expelled out of the line connection 44 through the non-return valve 52 into the surroundings 50 of the hydraulic unit 10 by the eccentric 20 (FIG. 4 to FIG. 5).

In detail, the tube as line connection 44 is for this purpose arranged in part circumferentially around the outside wall 38 of the eccentric bearing 18. Arranged in this way, the tube is situated radially between the outside wall 38 and a part of the wall 36 of the hydraulic block 12 situated opposite the outside wall 38. The tube is externally mechanically deformed by the eccentric 20 during a rotational movement of the eccentric 20. Gas and/or other constituents that have entered through the end 46 are thereby forced through the tube as pumped medium.

This is done by the eccentric bearing 18 with its outside wall 38, over a partial rotational range 54, pressing the tube against the wall 36 as the eccentric 20 rotates. In so doing the tube wall 56 of the tube is compressed, forming a seal, in such a way that together with the non-return valve 52 inside the tube a temporarily closed pump chamber 58 is formed.

The pumped medium that has flowed in through the end 46 is at first trapped in the pump chamber 58. The trapped medium forces the tube wall 56 apart as the eccentric 20 continues to rotate downstream in the direction of the non-return valve 52. The trapped medium moreover presses against the non-return valve 5. Such a rotational position of the eccentric 20 is represented in FIG. 4.

As the eccentric 20 continues to rotate, the tube wall 56 is forced apart by the trapped medium until such time as its pressure is sufficient to open the non-return valve 52. With the non-return valve 52 opened, the medium then flows out into the surroundings 50 of the hydraulic unit and the tube recovers its original shape (FIG. 5).

The deformation of the tube described is repeated after one revolution of the eccentric 20, serving to continuously generate a vacuum in the eccentric chamber 40 whilst the hydraulic unit 10 is in operation. At the same time the non-return valve 52 prevents a return flow of the evacuated medium and allows the vacuum in the eccentric chamber 40 to be reliably maintained.

FIGS. 2 to 5 show the hydraulic unit 10 with a line connection 44, which in FIGS. 2 to 5 is led out of the eccentric chamber 40 to the side. Such lateral ducting is preferred.

Figure 6:
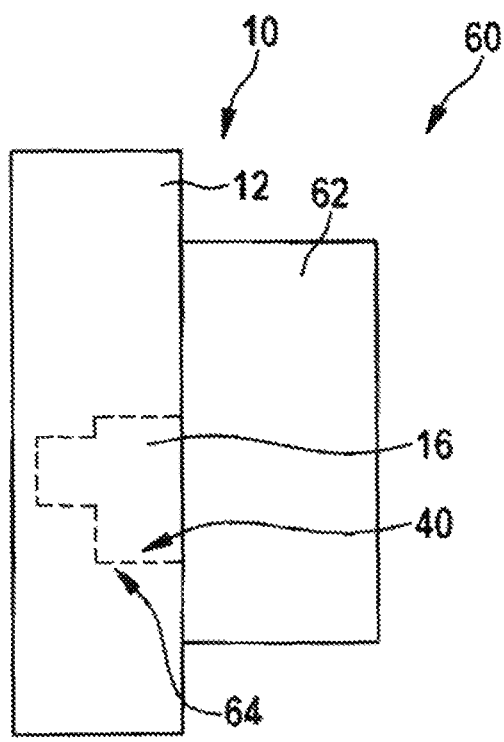
FIG. 6 shows a side view of the hydraulic unit according to FIG. 2.

FIG. 6 illustrates a fitted position 60 of the hydraulic unit 10 according to FIGS. 2 to 5 in a vehicle, not further represented. Here a motor casing 62, in which a part of the shaft 14 with drive motor (not further represented) coupled thereto is accommodated, is arranged at the side of the hydraulic block 12.

As a rule, any leakage of hydraulic fluid and/or engine fluid collects in the lower area of the hydraulic unit 10 defined by the fitted position 60, especially on an underside 64 of the eccentric chamber 40. From there the leakage can be pumped off by means of the vacuum pump 42 together with the gas present in the eccentric chamber 40. The pumped medium then includes the gas and other constituents, such as hydraulic fluid and engine fluid.

For this purpose, in an advantageous embodiment, not represented, the line connection 44 is arranged on the underside 64 of the eccentric chamber 40 and led out of the eccentric chamber 40.

What is claimed is:

1. A hydraulic unit of a vehicle brake system, comprising:
   an eccentric enclosed by an eccentric chamber;
   at least one pump element driven by the eccentric; and
   a vacuum pump configured to maintain a vacuum in the eccentric chamber while the hydraulic unit operates.

2. The hydraulic unit according to claim 1, wherein the vacuum pump is driven by the eccentric.

3. The hydraulic unit according to claim 1, wherein the vacuum pump is configured as a peristaltic pump.

4. The hydraulic unit according to claim 1, wherein the vacuum pump includes a line connection that leads out of the eccentric chamber, and wherein a non-return valve is arranged in the line connection.

5. The hydraulic unit according to claim 4, wherein the line connection is configured to lead into surroundings of the hydraulic unit.

6. The hydraulic unit according to claim 4, wherein the line connection is configured to lead out of an underside of the eccentric chamber relative to the fitted position of the hydraulic unit.

7. A method for operating a hydraulic unit of a vehicle brake system, comprising:
   driving at least one pump element of the hydraulic unit via an eccentric, the eccentric enclosed by an eccentric chamber; and
   maintaining a vacuum in the eccentric chamber via a vacuum pump of the hydraulic unit while operating the hydraulic unit.

8. The method according to claim 7, wherein the vacuum pump is driven by the eccentric.

9. The method according to claim 7, wherein the vacuum pump is configured as a peristaltic pump.

10. A vehicle brake system, comprising:
    a hydraulic unit that includes:
      an eccentric enclosed by an eccentric chamber,
      at least one pump element driven by the eccentric, and
      a vacuum pump configured to maintain a vacuum in the eccentric chamber while the hydraulic unit operates.

* * * * *